United States Patent
Kang et al.

(10) Patent No.: US 9,128,323 B2
(45) Date of Patent: Sep. 8, 2015

(54) DISPLAY DEVICE

(71) Applicant: LG DISPLAY CO., LTD., Seoul (KR)

(72) Inventors: Seoung Mo Kang, Paju-si (KR); Eun Ju Kim, Paju-si (JP); Jin Ryun Kim, Seoul (KR); Young Ki Song, Paju-si (KR); Sang Dae Park, Goyang-si (KR); Yang Hwan Kim, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 33 days.

(21) Appl. No.: 14/082,696

(22) Filed: Nov. 18, 2013

(65) Prior Publication Data

US 2014/0267980 A1    Sep. 18, 2014

(30) Foreign Application Priority Data

Mar. 15, 2013  (KR) .................. 10-2013-0027923

(51) Int. Cl.
*G02F 1/1335* (2006.01)
*G02F 1/1333* (2006.01)
*F21V 8/00* (2006.01)

(52) U.S. Cl.
CPC ........ *G02F 1/1336* (2013.01); *G02F 1/133308* (2013.01); *G02B 6/0088* (2013.01); *G02F 1/133512* (2013.01); *G02F 1/133615* (2013.01); *G02F 2001/133317* (2013.01)

(58) Field of Classification Search
CPC ...................... G02F 1/133308; G02F 1/133608
USPC ............... 349/61, 62, 58, 187; 362/97.1, 561, 362/624, 362, 257, 249.01, 311; 428/34; 156/85
See application file for complete search history.

(56) References Cited

U.S. PATENT DOCUMENTS

| | | | |
|---|---|---|---|
| 7,344,293 B2 * | 3/2008 | Oami | 362/624 |
| 2001/0029141 A1 * | 10/2001 | Mizutani et al. | 442/327 |
| 2006/0209502 A1 * | 9/2006 | Sakata et al. | 361/681 |
| 2008/0205066 A1 * | 8/2008 | Ohta et al. | 362/311 |
| 2009/0303413 A1 * | 12/2009 | Ohta et al. | 349/62 |
| 2010/0128198 A1 * | 5/2010 | Kim et al. | 349/61 |
| 2010/0165244 A1 * | 7/2010 | Shin et al. | 349/62 |
| 2011/0043719 A1 * | 2/2011 | Thunhorst et al. | 349/58 |
| 2011/0063854 A1 * | 3/2011 | Johnston et al. | 362/311.03 |
| 2012/0133859 A1 * | 5/2012 | Cha et al. | 349/61 |
| 2012/0169963 A1 * | 7/2012 | Park | 349/62 |
| 2012/0250354 A1 * | 10/2012 | Yoshida | 362/613 |
| 2013/0002985 A1 | 1/2013 | Hosoki | |

FOREIGN PATENT DOCUMENTS

| | | | |
|---|---|---|---|
| DE | 3140744 A1 | 4/1983 | |
| EP | 2639632 A1 | 9/2013 | |
| JP | 2007-178668 A | 7/2007 | |
| JP | 2009-003245 A | 1/2009 | |
| JP | 2009-175234 A | 8/2009 | |
| JP | 2009-300868 A | 12/2009 | |
| JP | 2011-164185 A | 8/2011 | |
| WO | 2011083634 A1 | 7/2011 | |
| WO | 2012070332 A1 | 5/2012 | |

* cited by examiner

*Primary Examiner* — Sang V Nguyen
(74) *Attorney, Agent, or Firm* — Dentons US LLP (57) ABSTRACT

Disclosed is a display device. The display device includes a liquid crystal panel, a backlight unit configured to include a light source that supplies light to the liquid crystal panel, and an optical member adhered to the liquid crystal panel. The optical member is formed to extend in an outer direction of the liquid crystal panel, and surrounds at least one of an outside of the liquid crystal panel and an outside of the backlight unit.

12 Claims, 8 Drawing Sheets

FIG. 1

Related Art

DISPLAY DEVICE

CROSS-REFERENCE TO RELATED APPLICATIONS

This application claims the benefit of the Korean Patent Application No. 10-2013-0027923 filed on Mar. 15, 2013, which is hereby incorporated by reference for all purposes as if fully set forth herein.

BACKGROUND OF THE INVENTION

1. Field of the Invention

The present invention relates to a display device.

2. Discussion of the Related Art

Generally, a related art liquid crystal display (LCD) device includes a liquid crystal panel, a backlight unit that is disposed under the liquid crystal panel, and a case top that is coupled on the liquid crystal panel.

Figure 1:
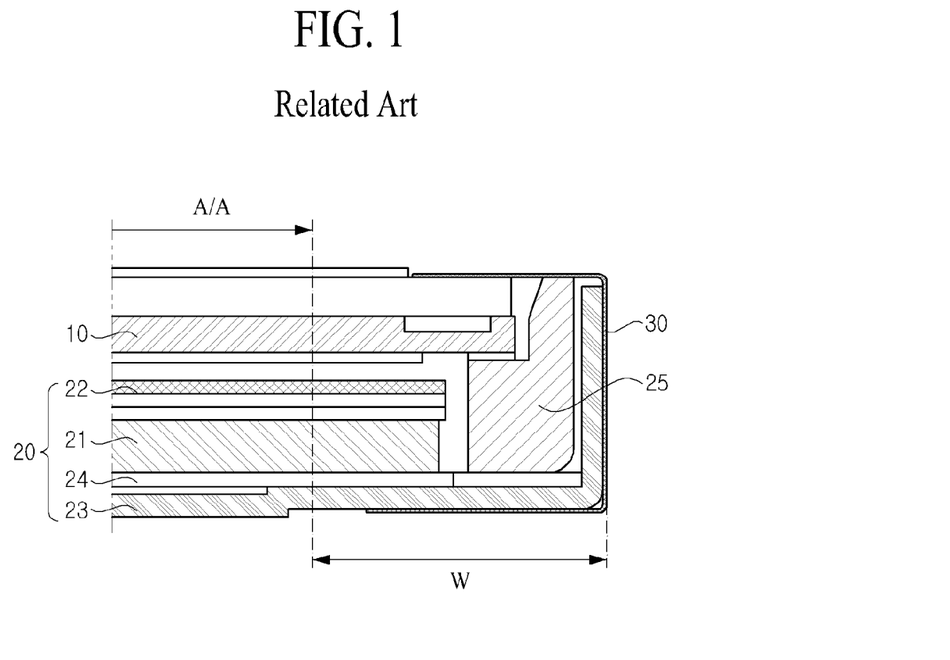
FIG. 1 is a cross-sectional view illustrating a related art LCD device.

In more detail, FIG. 1 illustrates a cross-sectional view of the related art LCD device. A related art backlight unit 20 includes a light source (not shown), a light guide panel 21, a plurality of optical sheets 22, a cover bottom 23, a reflective sheet 24, and a support main 25.

The light guide panel 21 transfers light from the light source toward a liquid crystal panel 10.

The plurality of optical sheets 22 collect and diffuse light transferred from the light guide panel 21.

The reflective sheet 24 reflects light, leaked from the light guide panel 21, toward the liquid crystal panel 10.

The cover bottom 23 accommodates the light source, the light guide panel 21, the plurality of optical sheets 22, and the reflective sheet 24.

The support main 25 is coupled to an inner side of the cover bottom 23 to support the liquid crystal panel 10.

The case top 30 is coupled to an upper edge of the liquid crystal panel 10 and an outer circumference surface of the cover bottom 23.

The related art LCD device has a problem in that a bezel area increases due to a structure including the support main 25 and the case top 30.

Especially, a width of a bezel that is an edge area of a display device increases due to an element such as the top case 30, and for this reason, there is a problem in the related art LCD realizing a narrow bezel.

In addition, since a total thickness of the backlight unit 20 becomes thicker, there is a problem in lightening and thinning the LCD device.

SUMMARY OF THE INVENTION

Accordingly, the present invention is directed to provide a display device that substantially obviates one or more problems due to limitations and disadvantages of the related art.

An aspect of the present invention is directed to provide a display device in which a liquid crystal panel is integrated with a backlight unit by using an optical member surrounding at least one of the outside of the liquid crystal panel and the outside of the backlight unit.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a liquid crystal panel; a backlight unit configured to include a light source that supplies light to the liquid crystal panel; and an optical member adhered to the liquid crystal panel, wherein the optical member is formed to extend in an outer direction of the liquid crystal panel, and surrounds at least one of an outside of the liquid crystal panel and an outside of the backlight unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Objects, special advantages, and new features of the present invention, and implementation methods thereof will be clarified through following embodiments described with reference to the accompanying drawings. In respectively adding reference numerals to elements of each drawing, detailed descriptions related to well-known functions or configurations will be ruled out in order not to unnecessarily obscure subject matters of the present invention. Also, it will be understood that although the terms first and second are used herein to describe various elements, these elements should not be limited by these terms. These terms are only used to distinguish one element from another element. In the following description, when the detailed description of the relevant known function or configuration is determined to unnecessarily obscure the important point of the present invention, the detailed description will be omitted.

Hereinafter, embodiments of the present invention will be described in detail with reference to the accompanying drawings.

Figure 2:
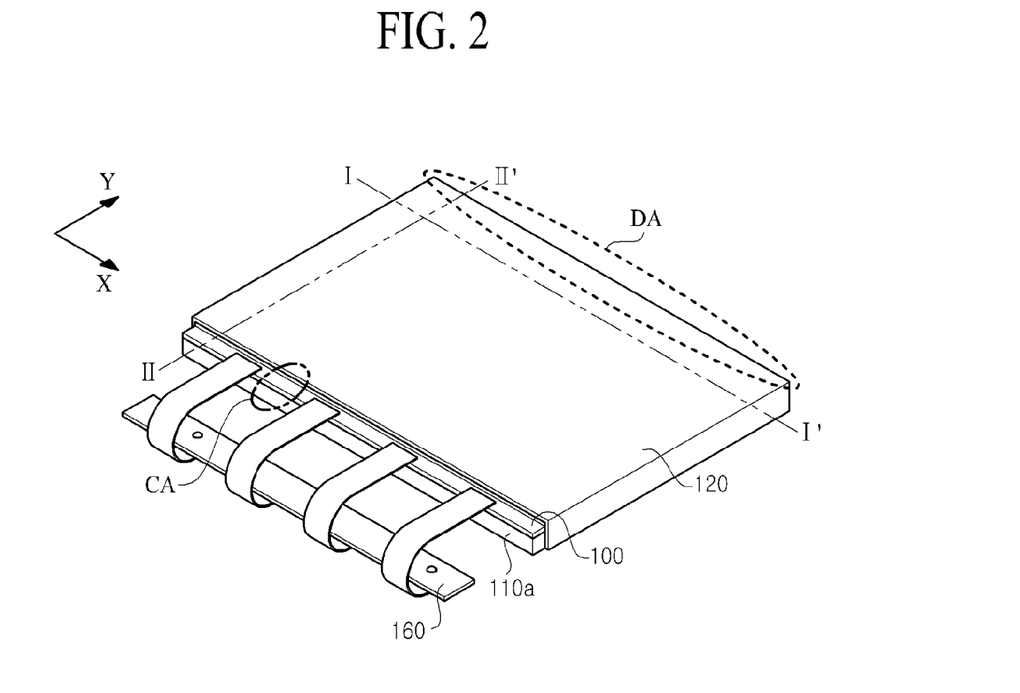
FIG. 2 is a coupled perspective view illustrating a display device according to the present invention.
Figure 3A:
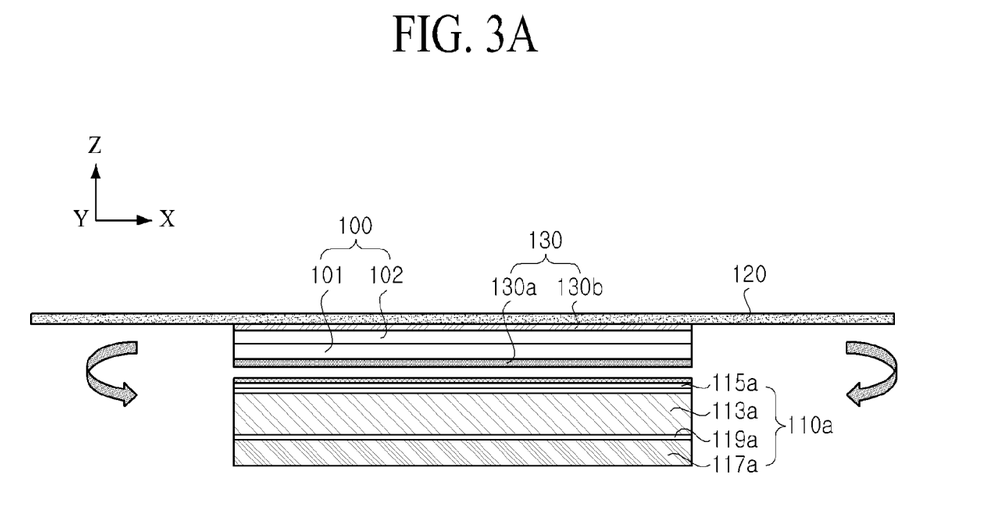
FIGS. 3A to 3C are cross-sectional views taken along line I-I' of FIG. 2 and illustrate an embodiment of the display device according to the present invention.
Figure 3B:
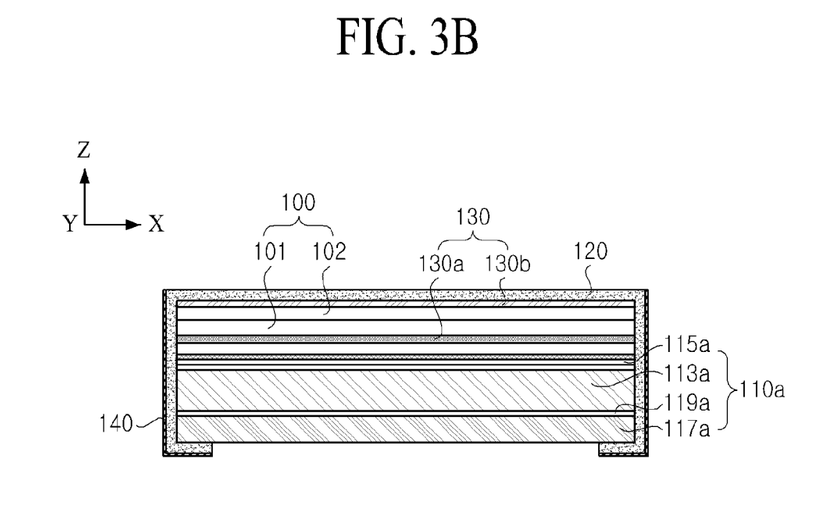
Figure 3C:
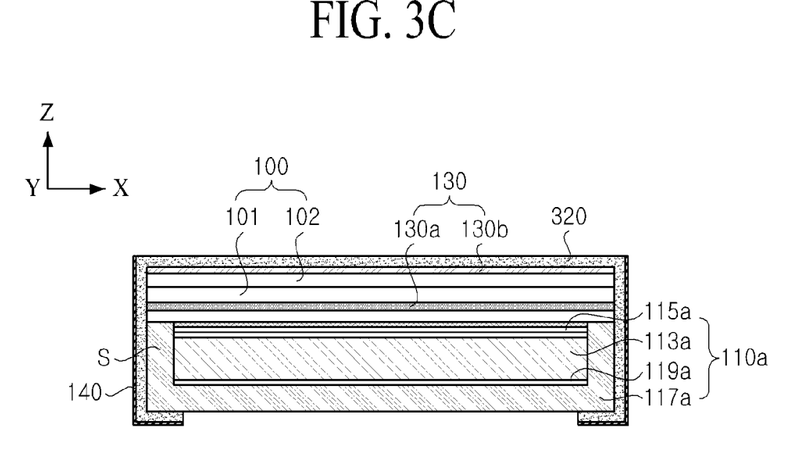

FIG. 2 is a coupled perspective view illustrating a display device according to the present invention, and FIGS. 3A to 3C are cross-sectional views taken along line I-I' of FIG. 1 and illustrating an embodiment of the display device according to the present invention. As illustrated, the display device includes a liquid crystal panel 100, a backlight unit 110a that includes a light source (not shown) for supplying light to the liquid crystal panel 100, and a optical member 120 that surrounds at least one of the outside of the liquid crystal panel 100 and the outside of the backlight unit 110a.

The liquid crystal panel 100, as illustrated in FIGS. 3A to 3C, includes an array substrate 101, a color substrate 102, and a liquid crystal layer (not shown) disposed between the array substrate 101 and the color substrate 102.

The liquid crystal panel 100 displays an image according to light supplied from the light source passing through the liquid crystal layer.

The light source may be configured with a light emitting diode (LED) array and a printed circuit board (PCB) with the LED array mounted thereon.

A polarizing part 130 may be coupled to one surface and the other surface of the liquid crystal panel 100.

More specifically, the polarizing part 130 includes a first polarizing member 130a and a second polarizing member 130b.

The first polarizing member 130a is coupled to under the array substrate 101, and the second polarizing member 130b is coupled onto the color substrate 102.

In more detail, the first polarizing member 130a polarizes light passing through the backlight unit 110a, and transfers the polarized light to the liquid crystal panel 100.

Moreover, the second polarizing member 130b polarizes light passing through the liquid crystal panel 100 so as to enable an external user to view an image.

A side sealing part (not shown) for preventing a damage (caused by an external impact) and light leakage of the liquid crystal panel 100 may be formed outside the liquid crystal panel 100.

An external power source and a signal supplying member 160 for supplying a gate signal and data signals may be connected to the liquid crystal panel 100 in a direction in which the light source is disposed.

More specifically, the signal supplying member 160 may be configured with a flexible circuit board and a chip-on film (COF) that is connected to the circuit board at one end of the COF and connected to the liquid crystal panel 100 at the other end.

In the COF, a board is formed by stacking a copper foil on polymide (a polymer material) and then forming a circuit. A driving circuit (drive IC), a circuit that generates source signals and the gate signal for driving the liquid crystal panel 100, may be bonded and mounted onto the board.

The optical member 120 surrounds at least one of the outside of the liquid crystal panel 100 and the outside of the backlight unit 110a depending on a position coupled to the display device.

That is, as illustrated in FIG. 2, the optical member 120 is formed to extend in an outer direction of the liquid crystal panel 100, and surrounds the outside of the display device.

More specifically, as illustrated in FIGS. 2, 3A and 3C, the optical member 120 is coupled onto the liquid crystal panel 100 to surround the outside of the liquid crystal panel 100 and the outside of the backlight unit 110a. A pressure sensitive adhesive (PSA) layer may be used for coupling the optical member 120 and the liquid crystal panel 100.

The optical member 120 may be formed of polyethylene terephtalate (PET) or triacetyl cellulose (TAC) that is a transparent material having a good light transmittance. Further, the optical member 120 may preferably have a light transmittance within a range of 90% to 100%. Also, the optical member 120 may preferably have a haze characteristic within a range of 0% to 8%.

The optical member 120 may include a bending part that guides the optical member 120 being bent for surrounding at least one of the outside of the liquid crystal panel 100 and the outside of the backlight unit 110a. That is, the bending part to be specifically described below guides the optical member 120 being bent toward the outside of the liquid crystal panel 100 or the outside of the backlight unit 110a.

Figure 4A:
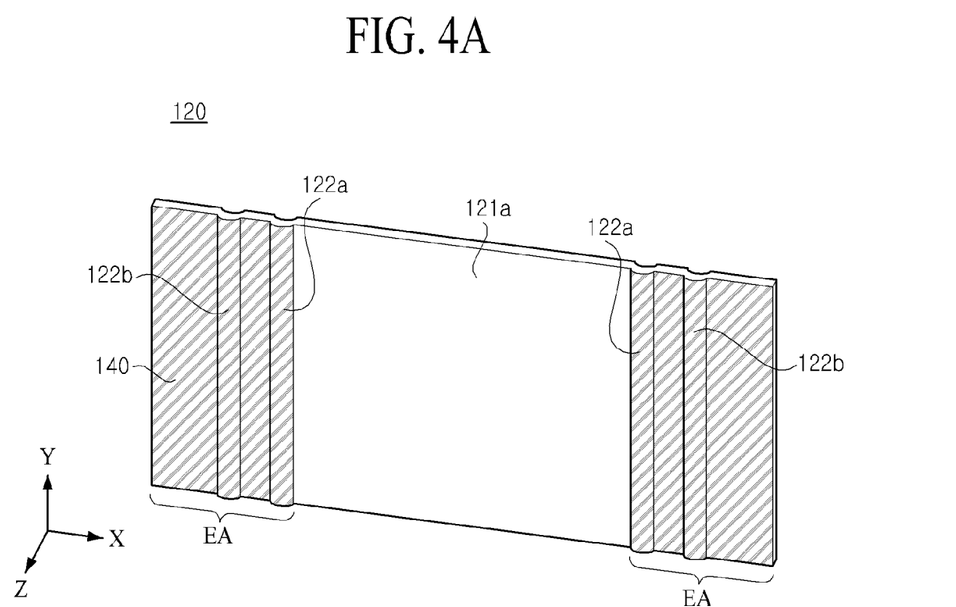
FIGS. 4A and 4B are perspective views illustrating an optical member configuring the display device of the present invention.
Figure 4B:
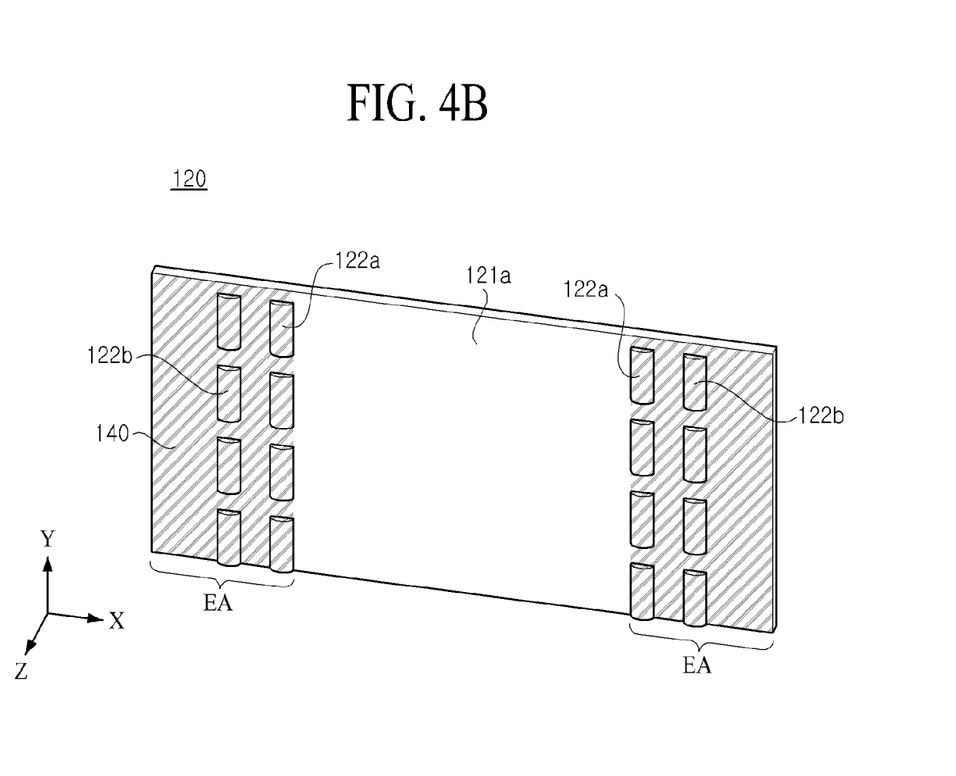

FIGS. 4A and 4B are perspective views illustrating an optical member configuring the display device of the present invention. As illustrated, each of a plurality of bending parts 122a and 122b is provided in plurality to be separated from each other by a certain interval, at one surface 121a of the optical member 120.

More specifically, the bending parts 122a and 122b are formed at an extension part EA of the optical member 120 which is formed to extend for surrounding the outside of the liquid crystal panel 100 and the outside of the backlight unit 110a. That is, the bending parts 122a and 122b guides the optical member 120 to be easily bent, for surrounding the outside of the liquid crystal panel 100 and the outside of the backlight unit 110a.

As illustrated in FIG. 3A, the optical member 120 is coupled onto the liquid crystal panel 100. Therefore, as illustrated in FIG. 4A, the optical member 120 is primarily bent at an upper distal end of the liquid crystal panel 100 by the bending part 122a.

Subsequently, the optical member 120 is secondarily bent by the bending part 122b for surrounding the outside of the backlight unit 110a, namely, for surrounding a side surface and then surrounding a rear surface of the backlight unit 110a. Therefore, the optical member 120 surrounds the outside of the liquid crystal panel 100 and the outside of the backlight unit 110a.

However, in the present invention, the number of bending parts 122a and 122b provided at one surface of the optical member 120 is not limited.

In FIG. 4A, the bending parts 122a and 122b are formed at the one surface 121a of the optical member 120 in a direction parallel to a Y direction with respect to the coordinate axis, but the bending parts are also provided in an X direction. Accordingly, the bending parts may be provided in all directions of the one surface 121a of the optical member 120. Further, as illustrated in FIG. 4A, the bending parts 122a and 122b may be provided to have a linear shape.

In addition, as illustrated in FIG. 4B, the bending parts 122a and 122b may be provided to have a discontinuous shape.

Figure 5A:
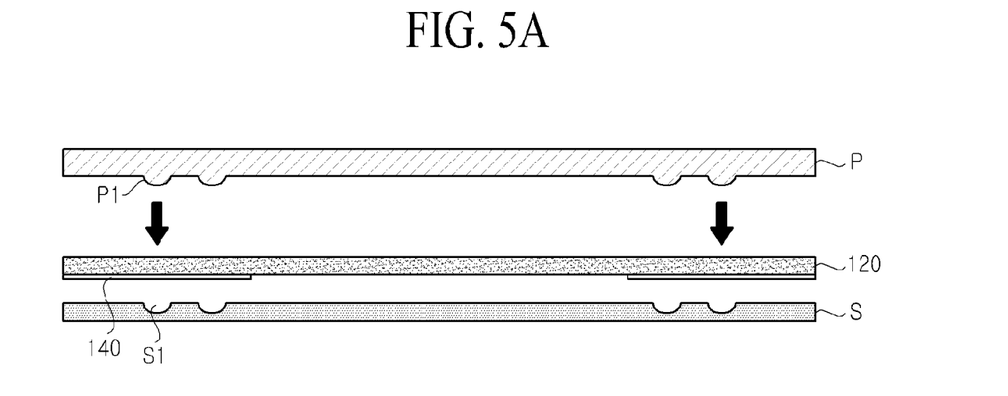
FIGS. 5A to 5C are cross-sectional views illustrating a method of manufacturing the optical member of FIG. 4A.
Figure 5B:
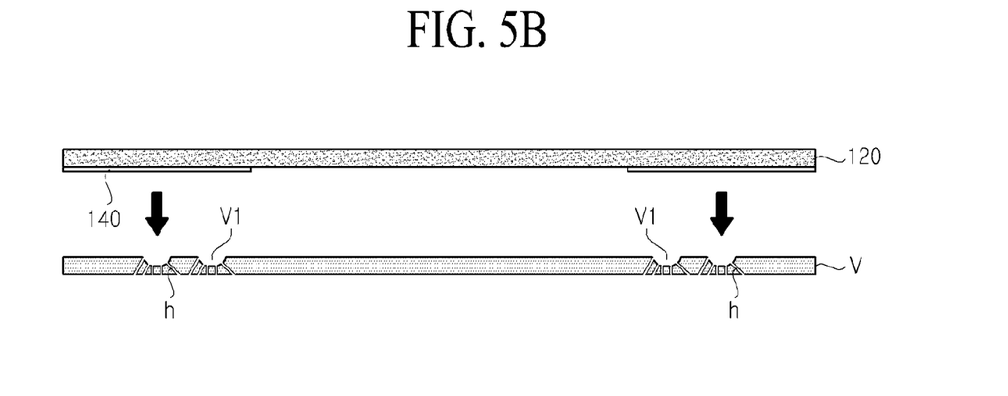
Figure 5C:
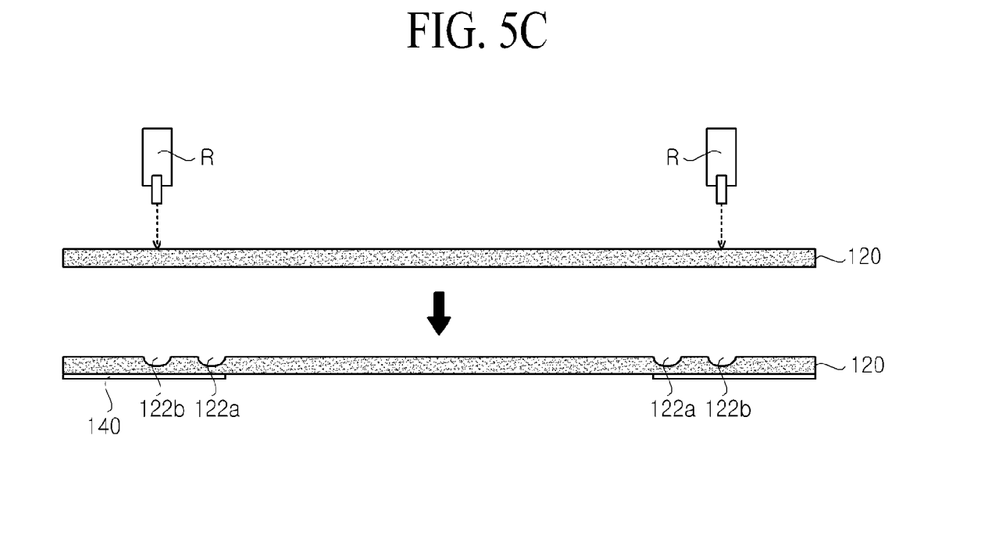

FIGS. 5A to 5C are cross-sectional views illustrating a method of manufacturing the optical member of FIG. 4A. As illustrated, the bending parts 122a and 122b may be formed at the optical member 120 by various manufacturing methods.

For example, as illustrated in FIG. 5A, the bending parts 122a and 122b may be provided at the one surface 121a of the optical member 120 by using a press manufacturing method.

First, a light leakage preventing member 140 to be described below is coupled to the one surface 121a of the optical member 120 at which the bending part will be provided. Subsequently, the optical member 120 is disposed on a stage S including a negative pattern 51 having the same shape as the bending parts 122a and 122b, and is pressurized by a press apparatus P. Therefore, the bending parts 122a and 122b are formed to have a convex shape corresponding to the groove pattern 51 at the one surface 121a of the optical member 120, and more specifically, at an area with the light leakage preventing member 140 coupled thereto.

For another example, as illustrated in FIG. 5B, the bending parts 122a and 122b may be formed at the one surface 121a of the optical member 120 by a vacuum-molding manufacturing method.

First, the optical member 120 is elongated for a certain time at a certain temperature.

Subsequently, the light leakage preventing member 140 to be described below is coupled to the one surface 121a of the optical member 120 at which the bending part will be provided.

Subsequently, the optical member 120 is disposed on a vacuum adsorption stage V that includes a negative pattern V1 having the same shape as the bending parts 122a and 122b. Here, the negative pattern V1 is configured with a plurality of holes h formed at the vacuum adsorption stage V.

Subsequently, the optical member 120 is absorbed through the holes h in a direction of the vacuum adsorption stage V.

Therefore, the bending parts 122a and 122b are formed to have a convex shape corresponding to the negative pattern V1 at the one surface 121a of the optical member 120, and more specifically, in an area in which the light leakage preventing member 140 is coupled.

For another example, as illustrated in FIG. 5C, the bending parts 122a and 122b may be formed at the one surface 121a of the optical member 120 by using a laser irradiating method.

The bending parts 122a and 122b formed by the laser irradiating method have a groove shape unlike a shape of the bending parts (having a convex shape) formed by the above-described press manufacturing method and the vacuum-molding manufacturing method.

First, a plurality of laser irradiating parts R which are separated from each other at certain intervals are disposed on the optical member 120. Subsequently, by irradiating a laser on a top of the optical member 120, the bending parts 122a and 122b having a groove shape are formed at the top of the optical member 120. The below-described light leakage preventing member 140 is coupled to the one surface 121a of the optical member 120 opposite to the top of the optical member with the bending parts 122a and 122b formed thereat. The bending parts 122a and 122b, which guide the optical member 120 to be easily bent, may be formed at the one surface of the optical member 120 by using the method of manufacturing the bending part which has been described above through various embodiments with reference to FIGS. 5A to 5C.

Referring again to FIGS. 3A to 3C, the optical member 120 is coupled onto the liquid crystal panel 100.

As illustrated in FIG. 3A, the optical member 120 is formed to extend an outer direction of the liquid crystal panel 100.

More specifically, as illustrated in FIG. 2, a side surface of the optical member 120 which is disposed in a direction vertical to the light source disposed in a direction (the X-axis direction) in which the signal supplying member 160 is connected is formed to extend in the X-axis direction.

That is, as illustrated in FIGS. 3B and 3C, the optical member 120 surrounds all the outside of the liquid crystal panel 100 and the outside of the backlight unit 110a. A structure such as the case top and the guide panel configuring the related art display device is removed, and the liquid crystal panel 100 is integrated with the backlight unit 110a by using the optical member 120 thus lightening the display device.

In addition, the liquid crystal panel 100 is closely adhered to the backlight unit 110a by using the optical member 120, and thus can thin the display device and enhance coupling power.

In the optical member 120 of FIGS. 3A to 3C, only a side surface vertical to the light source is formed to extend in the X-axis direction, but a side surface of the optical member 120 parallel to the light source may be formed to extend in the Y-axis direction.

Therefore, as illustrated in FIG. 2, except the signal supplying member 160, a CA area and a DA area opposite thereto (which are partial areas of the display device) may be surrounded by the optical member 120. That is, in the optical member 120, in addition to a side surface vertical to the light source, a side surface parallel to the light source surfaces parallel is also formed to extend, and therefore, as illustrated in FIG. 2, the optical member 120 surrounds the CA area and DA area opposite thereto of the display device, thus enhancing coupling power between the liquid crystal panel 100 and the backlight unit 110a.

As illustrated in FIGS. 3B and 3C, the light leakage preventing member 140 that prevents a light leakage of the light source may be coupled to the polarizing part 120.

In more detail, the light leakage preventing member 140 may be coupled to at least one of one surface and the other surface of the polarizing part 120 that surrounds the outside of the liquid crystal panel 100 and the outside of the backlight unit 110a. That is, as illustrated in FIGS. 3B and 3C, the light leakage preventing member 140 is coupled to an outer surface of the optical member 120 that surrounds the outside of the liquid crystal panel 100 and the outside of the backlight unit 110a. Alternatively, the light leakage preventing member 140 may be coupled to an inner surface of the optical member 120. Therefore, light of the light source is prevented from being leaked to outside the display device.

Moreover, the light leakage preventing member 140 may be formed of at least one of a light blocking tape, a black printing member formed by a printing method, a light absorbing member, and a black dye formed by an inkjet method, for preventing light of the light source from being leaked to outside the display device. When the light leakage preventing member 140 is coupled to the inner surface of the optical member 120, a member having a color instead of black may be coupled to the outer surface of the optical member 120. For example, when the light leakage preventing member 140 is coupled to the inner surface of the optical member 120, a member having a fluorescent color may be coupled to the outer surface of the optical member 120, thus providing a beautiful design to a user.

Figure 6:
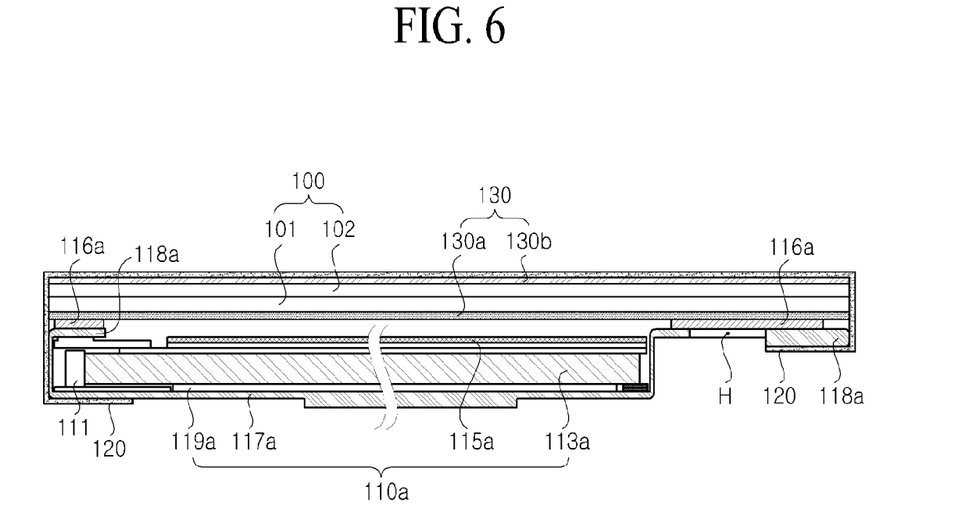
FIG. 6 is a cross-sectional view taken along line II-II' of FIG. 2 and illustrate a backlight unit configuring the display device according to the present invention.

FIG. 6 is a cross-sectional view taken along line II-II' of FIG. 2 and illustrating a backlight unit configuring the display device according to the present invention. As illustrated, the backlight unit 110a configuring the display device includes a light guide panel 113a, a plurality of optical sheets 115a, an accommodating member 117a, and a reflective sheet 119a.

The light guide panel 113a changes light, which is incident from the light source 111, to flat light and supplies the flat light to the liquid crystal panel 100.

The plurality of optical sheets 115a collect and diffuse the light transferred from the light guide panel 113a.

In more detail, the plurality of optical sheets 115a may include at least one diffusive sheet and at least one light collecting sheet disposed on the diffusive sheet.

The diffusive sheet may diffuse light which is incident toward the liquid crystal panel 100 through the light guide panel 113a, and simultaneously adjust a direction of the diffused light so as to travel the light toward the light collecting sheet.

Moreover, the light collecting sheet collects light, which is incident through the diffusive sheet, in a direction vertical to the liquid crystal panel 100.

An accommodating part for accommodating the light guide panel 113a and the plurality of optical sheets 115a is formed in the accommodating member 117a. Also, the accommodating member 117a includes a plurality of supporting parts 118a for supporting the liquid crystal panel 100.

A form pad type of coupling member 116a that includes both surfaces of an adhesive material and has elastic power is disposed on the supporting part 118a, for fixing and coupling the backlight unit 110 to the liquid crystal panel 100.

Moreover, as illustrated in FIG. 3C, the accommodating member 117a may further include a side reinforcing member S that is formed to protrude toward the liquid crystal panel 100, for protecting the light guide panel 113a, the plurality of optical sheets 115a, and the reflective sheet 119a against an external impact.

The reflective sheet 119a is disposed between the light guide panel 113a and the cover bottom 117a to reflect light, leaked from the light guide panel 113a, toward the liquid crystal panel 100.

To summarize, as described above with reference to FIGS. 2, 3A and 4A, a side surface of the optical member 120 in a direction vertical to the light source is formed to extend in an outer direction of the liquid crystal panel 100, and thus, the optical member 120 surrounds the outside of the liquid crystal panel 100 and the outside of the backlight unit 110a.

In addition, a side surface of the optical member 120 in a direction parallel to the light source 111 is also formed to extend in the outer direction of the liquid crystal panel 100, and thus, as illustrated in FIGS. 2 and 6, the optical member 120 surrounds the CA area and DA area opposite thereto of the display device. Therefore, all outer sides of the display device can be surrounded by the optical member 120.

More specifically, as illustrated in FIG. 6, the optical member 120 may surround the outside of the accommodating member 117a in a direction (the CA area of FIG. 2) in which the light source 111 is disposed.

Moreover, the optical member 120 may surround the outside of the accommodating member 117a in a direction (the DA area of FIG. 2) in which the through hole H for externally exposing a lens part of a camera is formed. Therefore, the optical member 120 can surround the outside of the liquid crystal panel 100 and the outside of the accommodating member 117a configuring the backlight unit 110, thus enhancing coupling power between the liquid crystal panel 100 and the backlight unit 110a.

Figure 7:
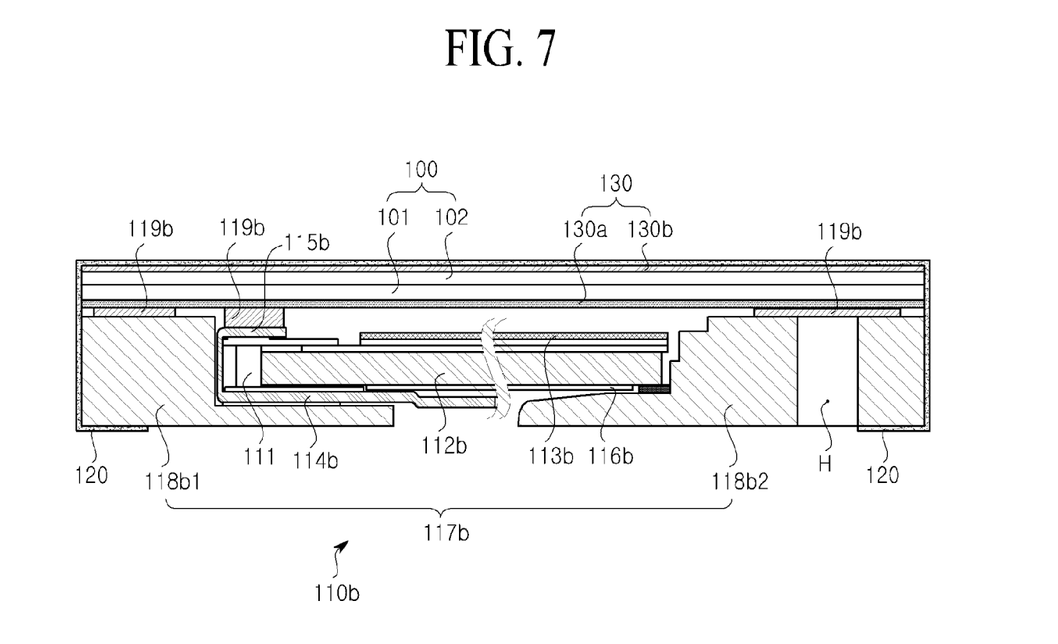
FIG. 7 is a cross-sectional view taken along line II-II' of FIG. 2 and illustrate another embodiment of a backlight unit configuring the display device according to the present invention.

FIG. 7 is a cross-sectional view taken along line II-II' of FIG. 2 and illustrating another embodiment of a backlight unit configuring the display device according to the present invention. As illustrated, the backlight unit 110b configuring the display device includes a light guide panel 112b, a plurality of optical sheets 113b, a light source accommodating member 114b, a reflective sheet 116b, and a liquid crystal panel supporting part 117b.

The light guide panel 112b changes light, which is incident from the light source 111, to flat light and supplies the flat light to the liquid crystal panel 100.

The plurality of optical sheets 113b collect and diffuse the light transferred from the light guide panel 112b.

In more detail, the plurality of optical sheets 113b may include at least one diffusive sheet and at least one light collecting sheet.

The diffusive sheet may diffuse light which is incident toward the liquid crystal panel 100 through the light guide panel 112b, and simultaneously adjust a direction of the diffused light so as to travel the light toward the light collecting sheet.

Moreover, the light collecting sheet collects light, which is incident through the diffusive sheet, in a direction vertical to the liquid crystal panel 100.

As illustrated in FIG. 7, an accommodating space for accommodating the light guide panel 112b is formed in the light source accommodating member 114b, and a cross-sectional surface of the light source accommodating member 114b is formed in a ⊂-shape.

The light source accommodating member 114b includes a supporting part 115b that covers a portion of a light incident part of the light guide panel 112b facing the light source 111 and supports the liquid crystal panel 100.

The reflective sheet 116b reflects light, leaked from the light guide panel 112b, toward the liquid crystal panel 100.

The liquid crystal panel supporting part 117b includes an accommodating space that is formed for accommodating the light guide panel 112b, the plurality of optical sheets 113b, the light source accommodating member 114b coupled to the inside of the light source 111, and the reflective sheet 116b.

Further, the liquid crystal panel supporting part 117b includes a plurality of supporting members 118b for supporting the liquid crystal panel 100.

In more detail, the liquid crystal panel supporting part 117b includes a first supporting member 118b1 and a second supporting member 118b2.

The first supporting member 118b1 is formed to protrude in a direction from the liquid crystal panel supporting part 117b to the liquid crystal panel 100 so as to surround an outer circumference surface of the light source accommodating member 114b having a ⊂-shape.

The second supporting member 118b2 is formed to protrude in a direction from the liquid crystal panel supporting part 117b to the liquid crystal panel 100 so as to be opposite to a non-incident part of the light guide panel 112b. Further, the second supporting member 118b2 includes a plurality of stepped portions such that the reflective sheet 116b, the light guide panel 112b, and the plurality of optical sheets 113b are sequentially stacked in the liquid crystal panel supporting part 117b.

Therefore, as illustrated in FIG. 7, the first supporting member 118b1, the second supporting member 118b2, and the light source accommodating member 114b may simultaneously support the liquid crystal panel 100.

A form pad type of coupling member 119b that includes both surfaces of an adhesive material and has elastic power is disposed on the first supporting member 118b1, the second supporting member 118b2, and the supporting part 115b which face the liquid crystal panel 100, and thus, the backlight unit 110b can be fixed and coupled to the liquid crystal panel 100.

Moreover, identically to the accommodating member 117a of FIG. 3C, the liquid crystal panel supporting part 117b may further include a side reinforcing member (not shown) that is formed to protrude toward the liquid crystal panel 100, for protecting the light guide panel 112b, the plurality of optical sheets 113b, the light source accommodating member 114b, and the reflective sheet 116b against an external impact.

As described above with reference to FIGS. 2, 3A and 4A, in addition to a side surface of the optical member 120 vertical to the light source 111, a side surface of the optical member 120 parallel to the light source 111 may be formed to extend in an outer direction of the liquid crystal panel 100.

Therefore, as illustrated in FIGS. 2 and 7, the optical member 120 surrounds the CA area of DA area opposite thereto of the display device, thereby surrounding all surfaces of the display device.

That is, as illustrated in FIG. 7, the optical member 120 may surround the outside of the first supporting member 118b1 configuring the liquid crystal panel supporting part 117b in a direction (the CA area of FIG. 2) in which the light source 111 is disposed.

Moreover, the optical member 120 may surround the outside of the second supporting member 118b2 configuring the liquid crystal panel supporting part 117b in a direction (the DA area of FIG. 2) in which the through hole H for externally exposing the lens part of the camera is formed.

Therefore, the optical member 120 can surround the outside of the liquid crystal panel supporting part 117b configuring the backlight unit 110b, thus enhancing coupling power between the liquid crystal panel 100 and the backlight unit 110b.

Figure 8A:
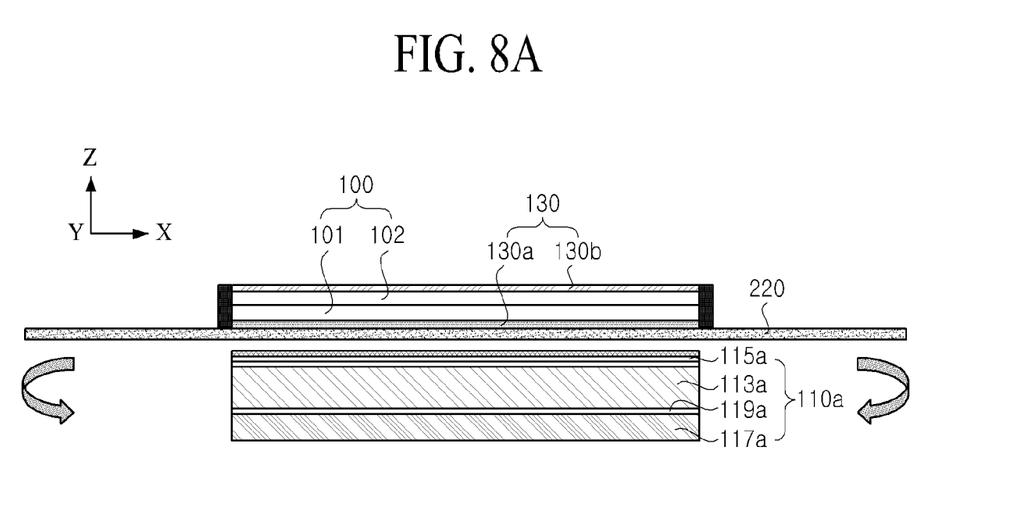
FIGS. 8A and 8B are cross-sectional views taken along line I-I' of FIG. 2 and illustrate another embodiment of a display device according to the present invention.
Figure 8B:
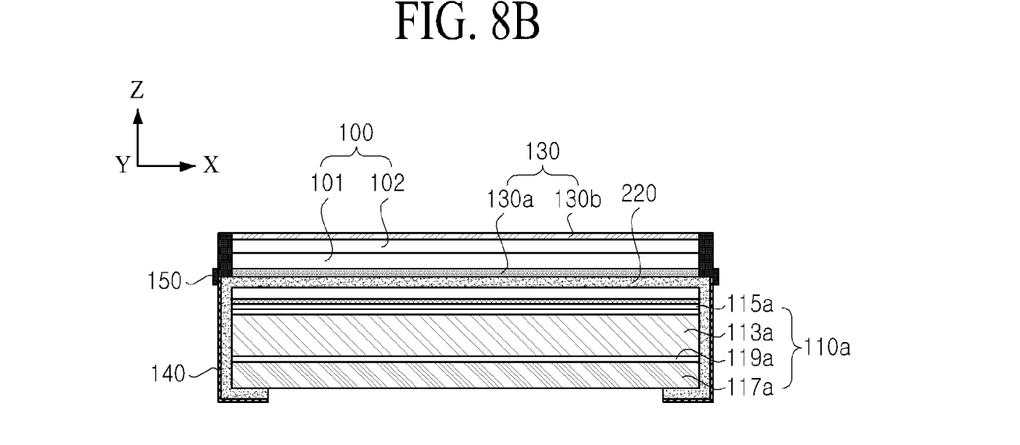

FIGS. 8A and 8B are cross-sectional views taken along line I-I' of FIG. 2 and illustrating another embodiment of a display device according to the present invention. In describing the embodiment, a description on elements equal to or corresponding to the preceding embodiment is not provided. Hereinafter, a display device according to the embodiment will be described with reference to FIGS. 8A and 8B.

The display device includes a liquid crystal panel 100, a backlight unit 110a including a light source (not shown) that supplies light to the liquid crystal panel 100, and an optical member 220.

The optical member 220 is adhered to under the liquid crystal panel 100, and is formed to extend in an outer direction of the liquid crystal panel 100.

Moreover, a pressure sensitive adhesive (PSA) layer may be used for coupling the optical member 220 to the liquid crystal panel 100.

That is, as illustrated in FIGS. 2 and 8A, a side surface of the optical member 220 in a direction vertical to the light source, which is disposed in a direction (the X-axis direction) in which the signal supplying member 160 is connected, is formed to extend in the X-axis direction.

Similarly to the optical member 120 which has been described above with reference to FIGS. 4A and 4B, a bending part that guides the optical member 220 being bent for surrounding the outside of the backlight unit 110a is formed at one surface of the optical member 220.

Therefore, as illustrated in FIG. 8B, the optical member 220 surrounds the outside of the backlight unit 110a.

The structure such as the case top and the guide panel configuring the related art display device is removed, and the liquid crystal panel 100 is integrated with the backlight unit 110a by using the optical member 220, thus lightening the display device.

Moreover, in the optical member 220 of FIGS. 8A and 8B, a side surface vertical to the light source is formed to extend in the X-axis direction, but a side surface of the optical member 220 parallel to the light source may be formed to extend in the Y-axis direction.

Therefore, as illustrated in FIG. 2, except the signal supplying member 160, a CA area and a DA area opposite thereto (which are partial areas of the display device) may be surrounded by the optical member 220.

That is, in the optical member 220, surfaces parallel to the light source are also formed to extend, and therefore, as illustrated in FIG. 2, the optical member 220 surrounds the CA area and DA area opposite thereto of the display device, thus enhancing coupling power between the liquid crystal panel 100 and the backlight unit 110a.

As illustrated in FIG. 8B, the light leakage preventing member 140 that prevents a light leakage of the light source may be coupled to the optical member 220.

In more detail, the light leakage preventing member 140 may be coupled to at least one of one surface and the other surface of the optical member 220 that surrounds the outside of the backlight unit 110a.

That is, as illustrated in FIG. 8B, the light leakage preventing member 140 is coupled to an outer surface of the optical member 220 that surrounds the outside of the backlight unit 110a.

Alternatively, the light leakage preventing member 140 may be coupled to an inner surface of the optical member 220. Therefore, light of the light source is prevented from being leaked to outside the display device.

Moreover, the light leakage preventing member 140 may be formed of at least one of a light blocking tape, a black printing member formed by a printing method, a light absorbing member, and a black dye formed by an inkjet method, for preventing light of the light source from being leaked to outside the display device.

When the light leakage preventing member 140 is coupled to the inner surface of the optical member 220, a member having a color instead of black may be coupled to the outer surface of the optical member 220. For example, when the light leakage preventing member 140 is coupled to the inner surface of the optical member 220, a member having a fluorescent color may be coupled to the outer surface of the optical member 220, thus providing a beautiful design to a user.

As illustrated in FIGS. 8A and 8B, a side sealing part for preventing a damage (caused by an external impact) and light leakage of the liquid crystal panel 100 may be formed at a side surface of the liquid crystal panel 100.

Moreover, a sealing member 150 may be coated on an outer surface of the light leakage preventing member 140 surrounding the outside of the backlight unit 110a and on the outside of the liquid crystal panel 100.

Therefore, coupling power between the liquid crystal panel 100 and the backlight unit 110a can be enhanced.

Figure 9A:
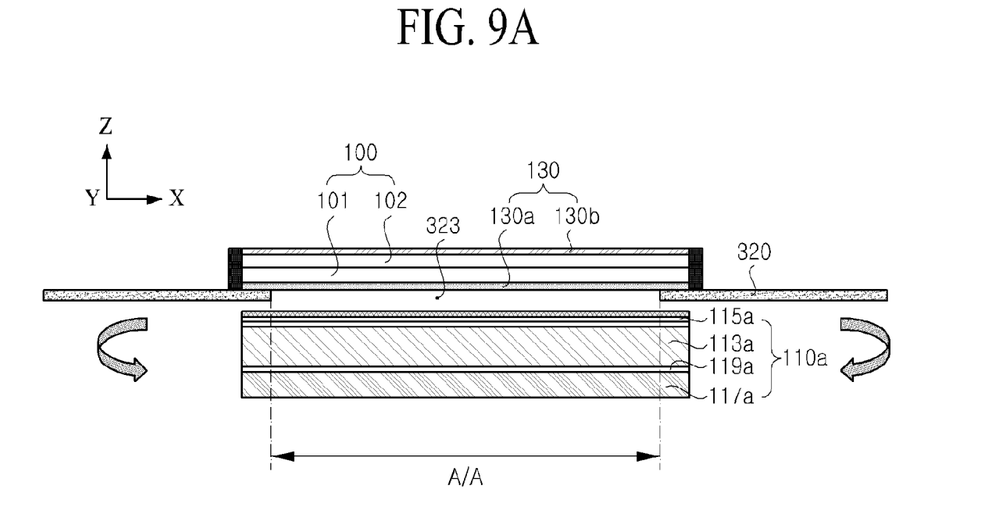
FIGS. 9A and 9B are cross-sectional views taken along line I-I' of FIG. 2 and illustrate another embodiment of a display device according to the present invention.
Figure 9B:
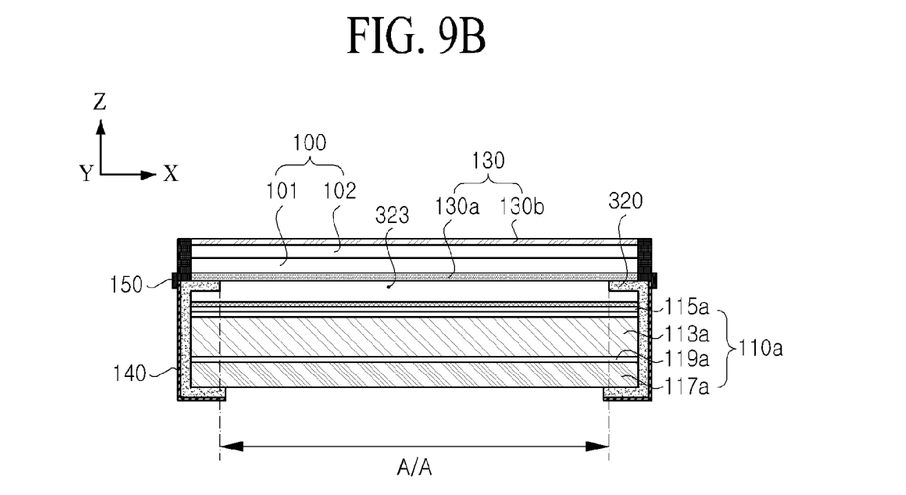

FIGS. 9A and 9B are cross-sectional views taken along line I-I' of FIG. 1 and illustrating another embodiment of a display device according to the present invention. In describing the embodiment, a description on elements equal to or corresponding to the preceding embodiment is not provided. Hereinafter, a display device according to the embodiment will be described with reference to FIGS. 8A and 8B.

The display device includes a liquid crystal panel 100, a backlight unit 110a including a light source that supplies light to the liquid crystal panel 100, and an optical member 320.

The optical member 320 is adhered to under the liquid crystal panel 100, and is formed to extend in an outer direction of the liquid crystal panel 100.

Moreover, a pressure sensitive adhesive (PSA) layer may be used for coupling the optical member 220 to the liquid crystal panel 100.

Moreover, an opening 323 may be formed at a central area of the optical member 320 corresponding to the liquid crystal panel 100.

In more detail, a size of the opening 323 may overlap an active area A/A of FIGS. 9A and 9B to have an area size equal to or greater than the active area A/A. That is, since the opening 323 is formed in the central area of the optical member 320, light emitted from the light source can be all supplied to the active area A/A of the liquid crystal panel 100 without being lost.

That is, as illustrated in FIGS. 2 and 9A, a side surface of the optical member 320 in a direction vertical to the light source, which is disposed in a direction (the X-axis direction) in which the signal supplying member 160 is connected, is formed to extend in the X-axis direction.

Similarly to the optical member 120 which has been described above with reference to FIGS. 4A and 4B, a bending part that guides the optical member 320 being bent for surrounding the outside of the backlight unit 110a is formed at one surface of the optical member 320.

Therefore, as illustrated in FIG. 9B, the optical member 320 surrounds the outside of the backlight unit 110a.

The structure such as the case top and the guide panel configuring the related art display device is removed, and the liquid crystal panel 100 is integrated with the backlight unit 110a by using the optical member 320, thus lightening the display device.

Moreover, in the optical member 320 of FIGS. 9A and 9B, a side surface vertical to the light source is formed to extend in the X-axis direction, but a side surface of the optical member 320 parallel to the light source may be formed to extend in the Y-axis direction.

Therefore, as illustrated in FIG. 2, except the signal supplying member 160, a CA area and a DA area opposite thereto (which are partial areas of the display device) may be surrounded by the optical member 320.

That is, in the optical member 320, surfaces parallel to the light source are also formed to extend, and therefore, as illustrated in FIG. 2, the optical member 320 surrounds the CA area and DA area opposite thereto of the display device, thus enhancing coupling power between the liquid crystal panel 100 and the backlight unit 110a.

As illustrated in FIG. 9B, the light leakage preventing member 140 that prevents a light leakage of the light source may be coupled to the optical member 320.

In more detail, the light leakage preventing member 140 may be coupled to at least one of one surface and the other surface of the optical member 320 that surrounds the outside of the backlight unit 110a. That is, as illustrated in FIG. 9B, the light leakage preventing member 140 is coupled to an outer surface of the optical member 320 that surrounds the outside of the backlight unit 110a.

Alternatively, the light leakage preventing member 140 may be coupled to an inner surface of the optical member 320. Therefore, light of the light source is prevented from being leaked to outside the display device.

Moreover, the light leakage preventing member 140 may be formed of at least one of a light blocking tape, a black printing member formed by a printing method, a light absorbing member, and a black dye formed by an inkjet method, for preventing light of the light source from being leaked to outside the display device.

When the light leakage preventing member 140 is coupled to the inner surface of the optical member 320, a member having a color instead of black may be coupled to the outer surface of the optical member 320. For example, when the light leakage preventing member 140 is coupled to the inner surface of the optical member 320, a member having a fluorescent color may be coupled to the outer surface of the optical member 320, thus providing a beautiful design to a user.

As illustrated in FIGS. 9A and 9B, a side sealing part for preventing a damage (caused by an external impact) and light leakage of the liquid crystal panel 100 may be formed at a side surface of the liquid crystal panel 100.

Moreover, a sealing member 150 may be coated on an outer surface of the light leakage preventing member 140 surrounding the outside of the backlight unit 110a and on the outside of the liquid crystal panel 100.

Therefore, coupling power between the liquid crystal panel 100 and the backlight unit 110a can be enhanced.

As described above, by reducing a thickness of the display device as much as possible, the present invention can design the display device to have a slim design, and realize a zero-bezel.

Moreover, the present invention integrates the liquid crystal panel and the backlight unit by using the optical member, thus lightening the display device.

Moreover, the present invention closely adheres the liquid crystal panel to the backlight unit by using the optical member, and thus can thin the display device and enhance coupling power.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
a liquid crystal panel;
a backlight unit configured to comprise a light source that supplies light to the liquid crystal panel; and
an optical member adhered to the liquid crystal panel,
wherein the optical member is formed to extend in an outer direction of the liquid crystal panel, and surrounds an outside of the liquid crystal panel and an outside of the backlight unit, or surrounds the outside of the backlight unit by the optical member,
wherein the optical member comprises a plurality of bending parts discontinuously formed and configured to guide the optical member being bent at a distal end of the liquid crystal panel for surrounding at least one of the outside of the liquid crystal panel and the outside of the backlight unit.

2. The display device of claim 1, wherein,
the optical member is coupled onto the liquid crystal panel, and
in the optical member, at least one of surfaces vertical to and surfaces parallel to the light source is formed to extend in the outer direction of the liquid crystal panel, and surrounds the outside of the liquid crystal panel and the outside of the backlight unit.

3. The display device of claim 1, wherein,
the optical member is coupled to under the liquid crystal panel, and
in the optical member, at least one of surfaces vertical to and surfaces parallel to the light source is formed to extend in the outer direction of the liquid crystal panel, and surrounds the outside of the backlight unit.

4. The display device of claim 3, wherein an opening is formed in a central area of the optical member corresponding to the liquid crystal panel.

5. The display device of claim 2, further comprising a light leakage preventing member coupled to the optical member to prevent the light from being leaked, the optical member being formed to extend in the outer direction of the liquid crystal panel.

6. The display device of claim 5, wherein the light leakage preventing member is coupled to at least one of inner surface and the outer surface of the optical member.

7. The display device of claim 5, wherein the light leakage preventing member is formed of at least one of a light blocking tape, a light absorbing member, a black printing member, and a black dye.

8. The display device of one of claim 2, further comprising:
  a light leakage preventing member coupled to the optical member to prevent the light from being leaked, the optical member being formed to extend in the outer direction of the liquid crystal panel; and
  a sealing member coated to overlap a side surface of the liquid crystal panel and a side surface of the light leakage preventing member.

9. The display device of claim 1, wherein the backlight unit comprises:
  a light guide panel configured to supply light, emitted from the light source, toward the liquid crystal panel;
  a plurality of optical sheets configured to diffuse and collect the light supplied from the light guide panel;
  an accommodating member configured to comprise a plurality of supporting parts that support the liquid crystal panel, an accommodating part being formed in the accommodating member; and
  a reflective sheet disposed between the light guide panel and the accommodating member to reflect light, leaked from the light guide panel, toward the liquid crystal panel.

10. The display device of claim 1, wherein the backlight unit comprises:
  a light guide panel configured to supply light, emitted from the light source, toward the liquid crystal panel;
  a plurality of optical sheets configured to diffuse and collect the light supplied from the light guide panel;
  a light source accommodating member configured to comprise a supporting part that supports the liquid crystal panel, the light source being disposed in the light source accommodating member;
  a liquid crystal panel supporting part configured to comprise a plurality of supporting members that support the liquid crystal panel, an accommodating part being formed in the liquid crystal panel supporting part; and
  a reflective sheet configured to reflect light, leaked from the light guide panel, toward the liquid crystal panel.

11. The display device of claim 10, wherein the liquid crystal panel supporting part comprises:
  a first supporting member formed to surround an outer circumference surface of the light source accommodating member, and configured to support the liquid crystal panel; and
  a second supporting member formed to be opposite to a non-incident part of the light guide panel, the second supporting member comprising a plurality of stepped portions in which the light guide panel, the plurality of optical sheets, and the reflective sheet are accommodated.

12. The display device of claim 1, wherein the bending part has a convex shape.

* * * * *